United States Patent
Ishiguro et al.

(10) Patent No.: US 9,258,391 B2
(45) Date of Patent: Feb. 9, 2016

(54) PROCESSING METHOD AND APPARATUS

(75) Inventors: Makiko Ishiguro, Kamagaya (JP); Shingo Iwasaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 12/767,232

(22) Filed: Apr. 26, 2010

(65) Prior Publication Data

US 2010/0306469 A1    Dec. 2, 2010

(30) Foreign Application Priority Data

May 29, 2009  (JP) ................... 2009-130937
Mar. 12, 2010 (JP) ................... 2010-056542

(51) Int. Cl.
*H04L 29/14* (2006.01)

(52) U.S. Cl.
CPC ..................... *H04L 69/40* (2013.01)

(58) Field of Classification Search
None
See application file for complete search history.

(56) References Cited

U.S. PATENT DOCUMENTS

| 5,734,381 | A  | * | 3/1998  | Yoshizawa ........... G06F 9/4443 345/691 |
| 6,477,587 | B1 | * | 11/2002 | Isoda ................ H04L 12/40123 710/20 |
| 7,894,383 | B2 | * | 2/2011  | Ikeda ..................... H04L 45/00 370/328 |
| 8,516,080 | B2 | * | 8/2013  | Chow ............... G06F 17/30902 709/203 |
| 2002/0038365 | A1 | * | 3/2002  | Yeh ................... G06F 17/30867 709/224 |
| 2002/0040385 | A1 | * | 4/2002  | Segawa ................... G06F 9/466 709/203 |
| 2003/0046345 | A1 | * | 3/2003  | Wada ..................... G06Q 10/06 709/205 |
| 2003/0120956 | A1 | * | 6/2003  | Chiu ..................... G06F 21/31 726/30 |
| 2005/0286461 | A1 | * | 12/2005 | Zhang ................. H04W 76/021 370/328 |
| 2006/0064466 | A1 | * | 3/2006  | Shiga .................. H04L 67/1097 709/214 |
| 2006/0195405 | A1 | * | 8/2006  | Miura ..................... G06F 21/10 705/65 |
| 2007/0143538 | A1 | * | 6/2007  | Sasaki .............. G11B 20/10527 711/113 |
| 2007/0174420 | A1 | * | 7/2007  | Khusial ............. G06F 17/30902 709/217 |
| 2008/0311853 | A1 | * | 12/2008 | Tamura ................... H04L 67/14 455/41.3 |
| 2009/0157896 | A1 | * | 6/2009  | Kim ....................... H04L 49/90 709/232 |
| 2009/0327454 | A1 |   | 12/2009 | Iwasaki ........................ 709/219 |
| 2011/0208761 | A1 | * | 8/2011  | Zybura ............. G06F 17/30171 707/756 |

FOREIGN PATENT DOCUMENTS

| JP | 5-324526 A     | 12/1993 |
| JP | 2001-318888 A  | 11/2001 |
| JP | 2002-118620 A  | 4/2002  |
| JP | 2003-122653 A  | 4/2003  |
| JP | 2004-265049 A  | 9/2004  |
| JP | 2007-226777 A  | 9/2007  |
| JP | 2009-76090 A   | 4/2009  |
| JP | 2009-271705 A  | 11/2009 |
| WO | WO 98/10575 A1 | 3/1998  |

* cited by examiner

*Primary Examiner* — Charles Rones
*Assistant Examiner* — Matthew Chrzanowski
(74) *Attorney, Agent, or Firm* — Fitzpatrick, Cella, Harper & Scinto

(57) ABSTRACT

A processing apparatus externally receives a processing request and executes the requested processing. The processing apparatus transmits the result of the processing to a processing request source if a connection to the processing request source is maintained until the requested processing is executed. The processing apparatus stores the result of executing the processing in a memory if the connection to the processing request source is disconnected before the end of the requested processing. The processing apparatus transmits the processing result stored in the memory to the processing request source if the processing requested when the processing request is received is executed but is stored in the memory.

13 Claims, 12 Drawing Sheets

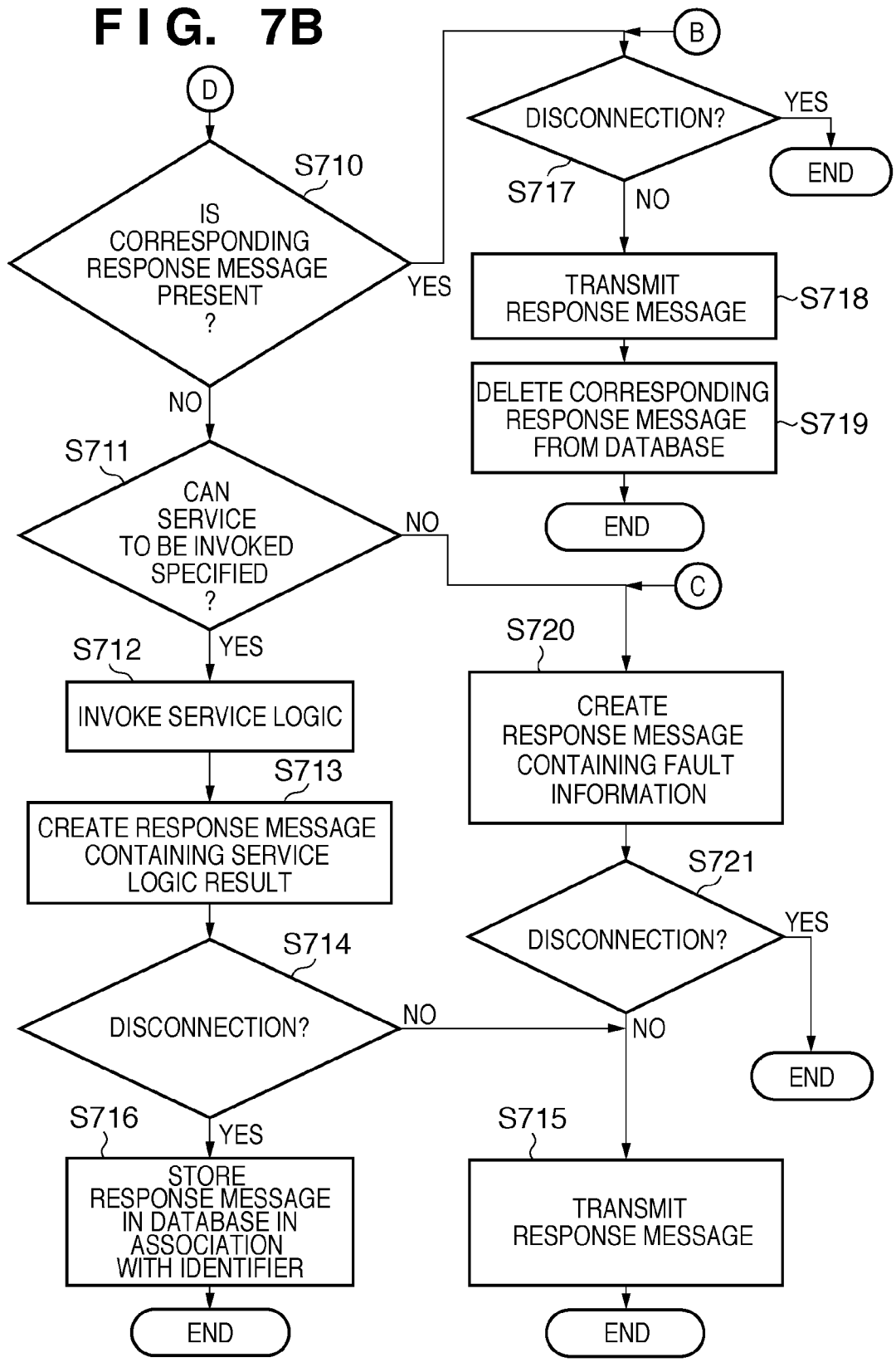

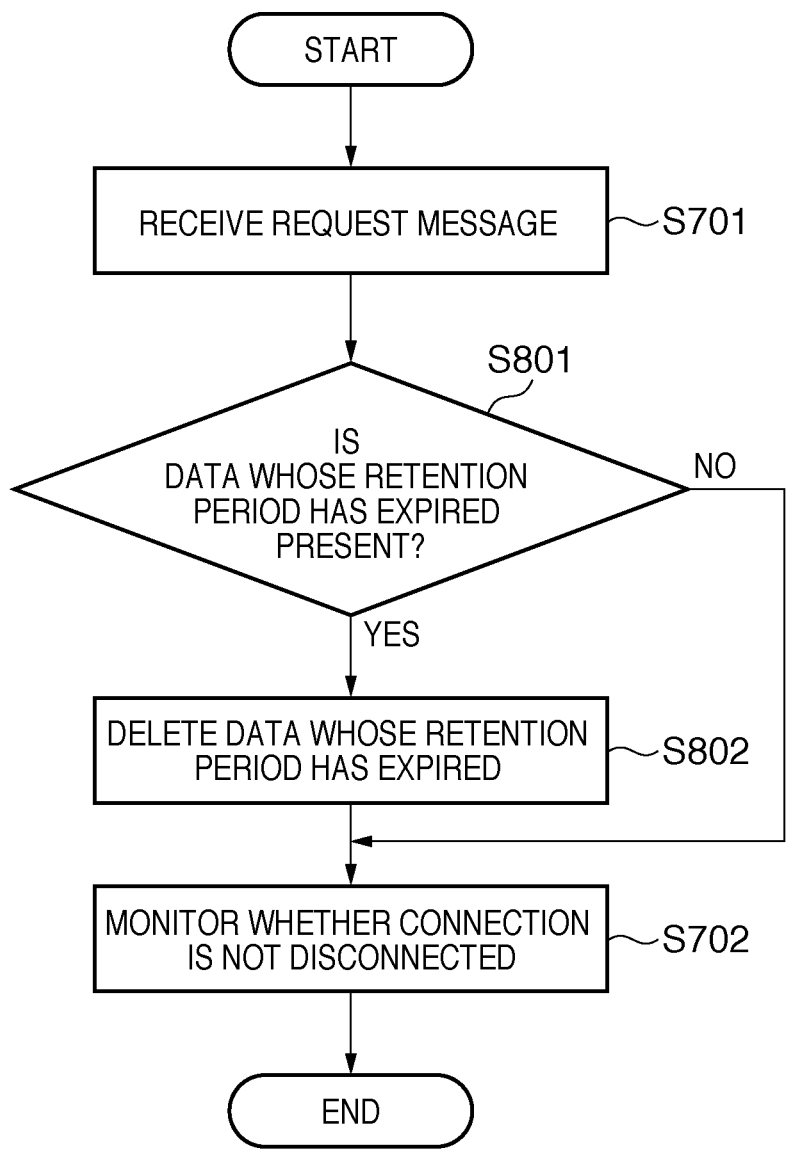

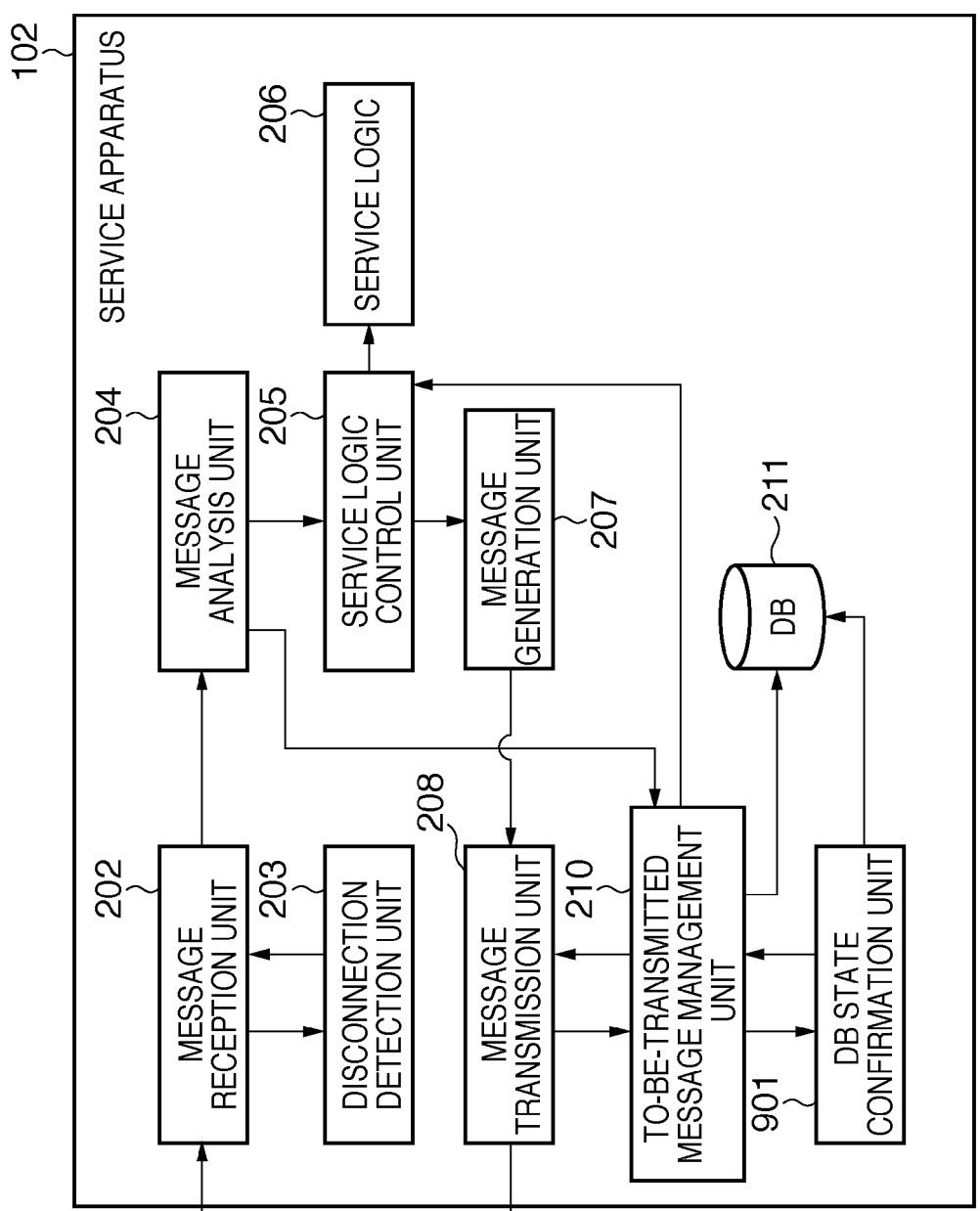

PROCESSING METHOD AND APPARATUS

BACKGROUND OF THE INVENTION

1. Field of the Invention

The present invention relates to a processing method and apparatus that execute requested processing.

2. Description of the Related Art

In recent years, it has become a common practice to establish cooperation between PCs and devices using Web service techniques for exchanging data among a plurality of apparatus via a network. A service receives a message to request service execution from a client, executes a service logic, and transmits a response message containing the execution result to the client.

If the connection between the service and the client is disconnected due to a network failure, time-out, or cancellation by the client after the service receives a request message, the service cannot interrupt the service logic execution processing. The service normally ends the processing when he or she notices disconnection in trying to write a response message after the end of the service logic execution. Therefore, the created response message is thrown away.

Under the circumstance, one conventional technique allows the use of information, cached without executing a service logic, under the control of a web service controller in response to a web service request (see US-2007-0174420).

This conventional technique uses a cache under all circumstances involved, so it is necessary to reserve memory sufficient to cache all types of information.

SUMMARY OF THE INVENTION

The present invention provides a processing method and apparatus that efficiently use the execution result of requested processing.

According to one aspect of the present invention, there is provided a processing method executed by a processing apparatus including a processor, the method comprising: externally receiving a processing request; executing the requested processing by the processor; transmitting a result of executing the processing to a processing request source if a connection to the processing request source is maintained until the execution of the requested processing; storing the result of executing the processing in a memory if the connection to the processing request source is disconnected before an end of the requested processing; and transmitting the processing result stored in the memory to the processing request source if the result of executing the processing requested is stored in the memory when the processing request is received.

According to another aspect of the present invention, there is provided a processing apparatus comprising: a communication unit; and a processing unit that executes processing requested by a processing request received by the communication unit, storing the result of executing the processing in a memory if a connection to a processing request source is disconnected before an end of the processing, and transmitting the result of executing the processing to the processing request source by the communication unit if the connection to the processing request source is maintained until the end of the processing, wherein if the result of executing the processing requested by the processing request received by the communication unit is stored in the memory, the processing unit transmits the processing result stored in the memory to the processing request source by the communication unit.

According to still another aspect of the present invention, there is provided a storage medium storing a computer program, the computer program causing a computer to execute: externally receiving a processing request; executing the requested processing; transmitting a result of executing the processing to a processing request source if a connection to the processing request source is maintained until the execution of the requested processing; storing the result of executing the processing in a memory if the connection to the processing request source is disconnected before an end of the requested processing; and transmitting the processing result stored in the memory to the processing request source if the result of executing the processing requested is stored in the memory when the processing request is received.

Further features of the present invention will become apparent from the following description of exemplary embodiments with reference to the attached drawings.

BRIEF DESCRIPTION OF THE DRAWINGS

FIGS. 7A and 7B are flowcharts showing the processing of the communication apparatus according to the embodiment;

FIG. 8 is a flowchart showing processing for deleting data whose retention period has expired;

FIG. 9 is a block diagram illustrating one example of the software configuration of a communication apparatus according to another embodiment of the present invention;

DESCRIPTION OF THE EMBODIMENTS

Modes for carrying out the invention will be described in detail below with reference to the accompanying drawings. One example of the hardware configuration of a communication apparatus according to an embodiment of the present invention will be explained first with reference to FIG. 1. Note that a service apparatus which executes a service in response to a service request from another apparatus and returns the execution result (response) to the other apparatus will be exemplified as a communication apparatus in this embodiment.

<First Embodiment>

Figure 1:
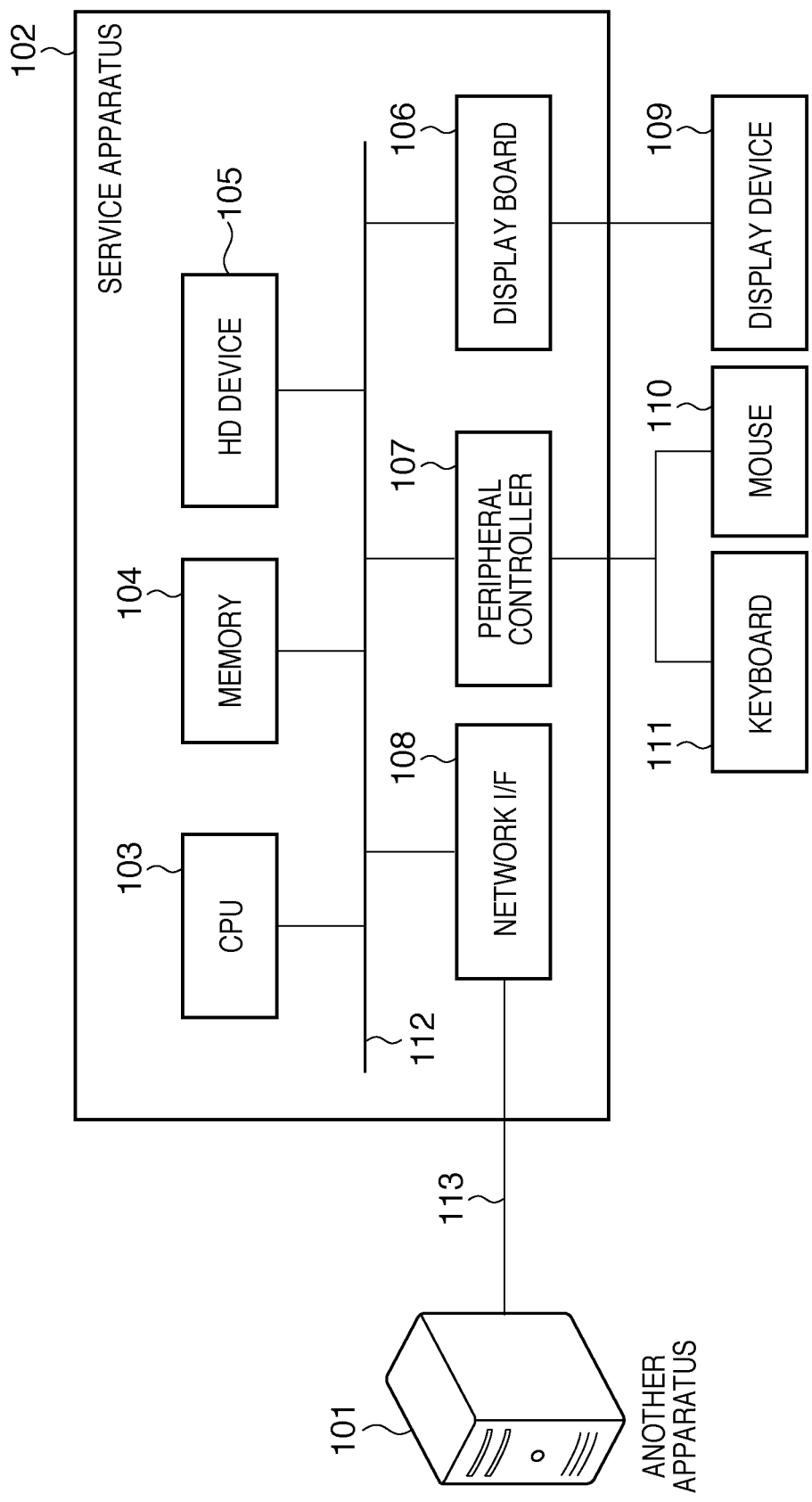
FIG. 1 is a block diagram illustrating one example of the hardware configuration of a communication apparatus according to an embodiment of the present invention.

Referring to FIG. 1, another apparatus 101 is an apparatus (computer) which uses a service and exchanges messages with a service apparatus (communication apparatus) 102 via a network 113. The service apparatus 102 includes a CPU 103, memory 104, HD (Hard Disk) device 105, display board 106, peripheral controller 107, and network I/F 108. The CPU 103 executes the processing of each processing unit in the service apparatus 102 in accordance with a program. The program is stored in the HD device 105 or in a ROM in the memory 104 and loaded into a RAM in the memory 104 when the CPU 103 executes the program. The memory 104 includes the ROM which stores a program and control data and a RAM serving as the working area of the CPU 103, and also stores XML elements and objects. The program is also used to cause a computer to function as a communication apparatus.

The HD device 105 includes an interface for controlling access to a hard disk and stores various kinds of data. The display board 106 includes an interface for connecting a display device 109 to it and uses the display device 109 to display the status of the service apparatus 102 and the processing result obtained by it. The peripheral controller 107 includes an interface for connecting a mouse 110 and keyboard 111 to it and controls instructions and various kinds of inputs to the service apparatus 102. The network I/F 108 includes an interface for communication via the network 113 and controls communication with the other apparatus 101.

A system bus 112 connects the above-mentioned units to each other. The network 113 may take any form as long as the other apparatus 101 and the service apparatus 102 can perform message communication with each other, and is, for example, the Internet, a WAN, or a LAN. The communication protocol used is not limited to a specific protocol, either.

Figure 2:
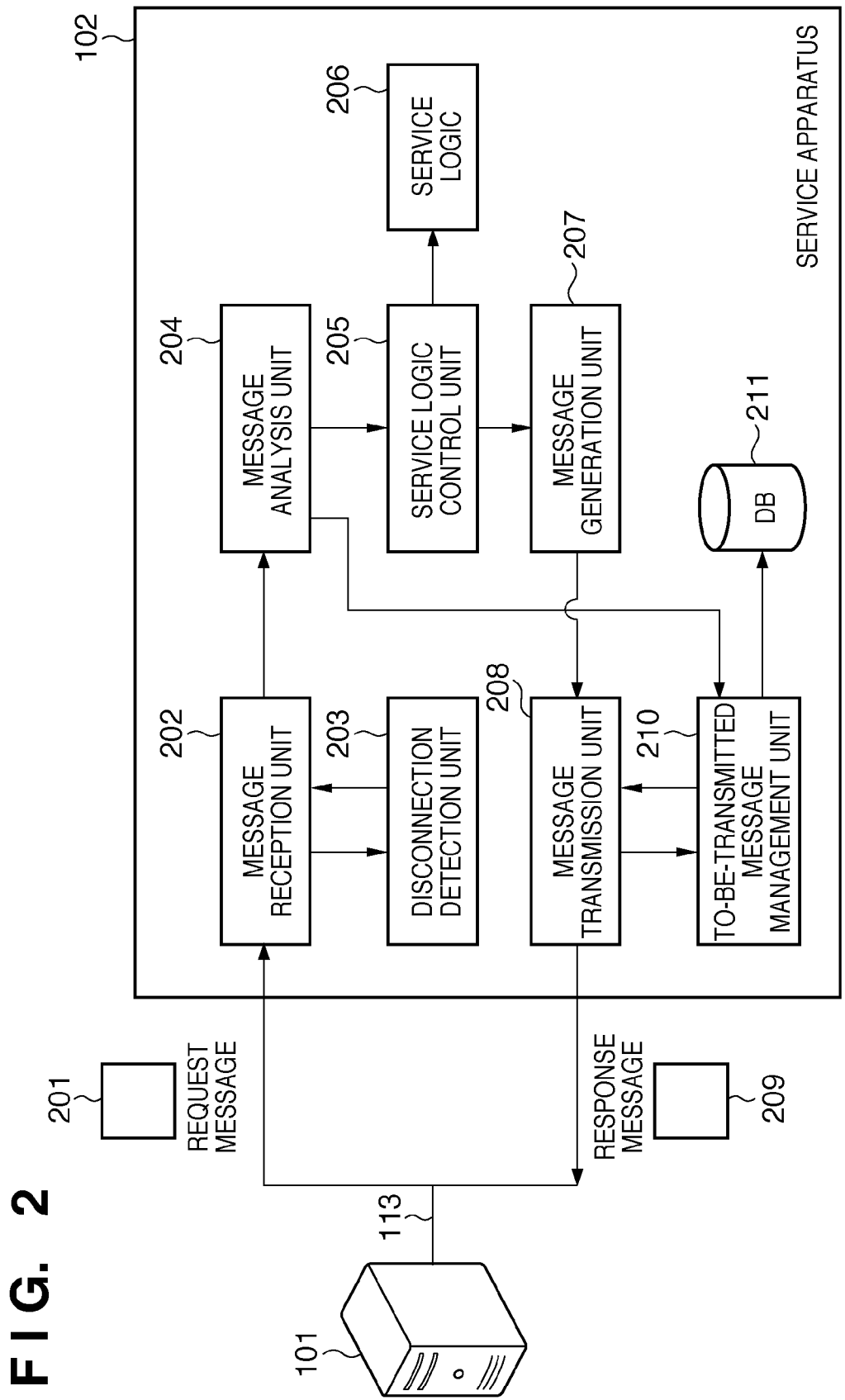
FIG. 2 is a block diagram illustrating one example of the software configuration of the communication apparatus according to the embodiment.

One example of the software configuration of the service apparatus 102 will be explained next with reference to FIG. 2. When the other apparatus 101 transmits a request message 201 as a message to request service execution, a message reception unit 202 receives the request message 201. Note that a disconnection detection unit 203 detects whether the connection between the other apparatus 101 and the service apparatus 102 is not disconnected. The message reception unit 202 receives the request message 201 via the network I/F 108 shown in FIG. 1.

If the connection is not disconnected, a message analysis unit 204 analyzes the request message 201 to determine the service to be invoked. The message analysis unit 204 also determines whether the request message 201 contains an identifier (ID) as message identification information.

When the message analysis unit 204 specifies the service to be invoked, a service logic control unit 205 invokes a service logic 206. Also, if the disconnection detection unit 203 detects disconnection, and the request message 201 has no identifier, the processing of the service logic 206 is interrupted. The service logic control unit 205 executes and interrupts a service defined in the service logic 206.

After the service execution of the service logic control unit 205 is completed, a message creation unit 207 creates a response message 209 to be returned to the other apparatus 101 based on the execution result of the service logic 206. A message transmission unit 208 transmits the response message 209 to the other apparatus 101 as a message indicating the service execution result. Also, if the service execution fails, the response message 209 serves as a message indicating failure information. The message transmission unit 208 transmits the response message 209 via the network I/F 108 shown in FIG. 1.

If the response message cannot be transmitted due to disconnection from the other apparatus 101, a to-be-transmitted message management unit 210 holds it in a database 211. This operation is done if the request message 201 from the other apparatus 101 has an identifier, and the identifier and the response message 209 are held in association with each other. Also, if a request message 201 containing the same identifier is transmitted from the other apparatus 101, the to-be-transmitted message management unit 210 transfers again the response message having already been associated with this identifier to the message transmission unit 208. The database 211 is a storage location where the to-be-transmitted message management unit 210 stores information, and is included in the HD device 105.

Figure 3:
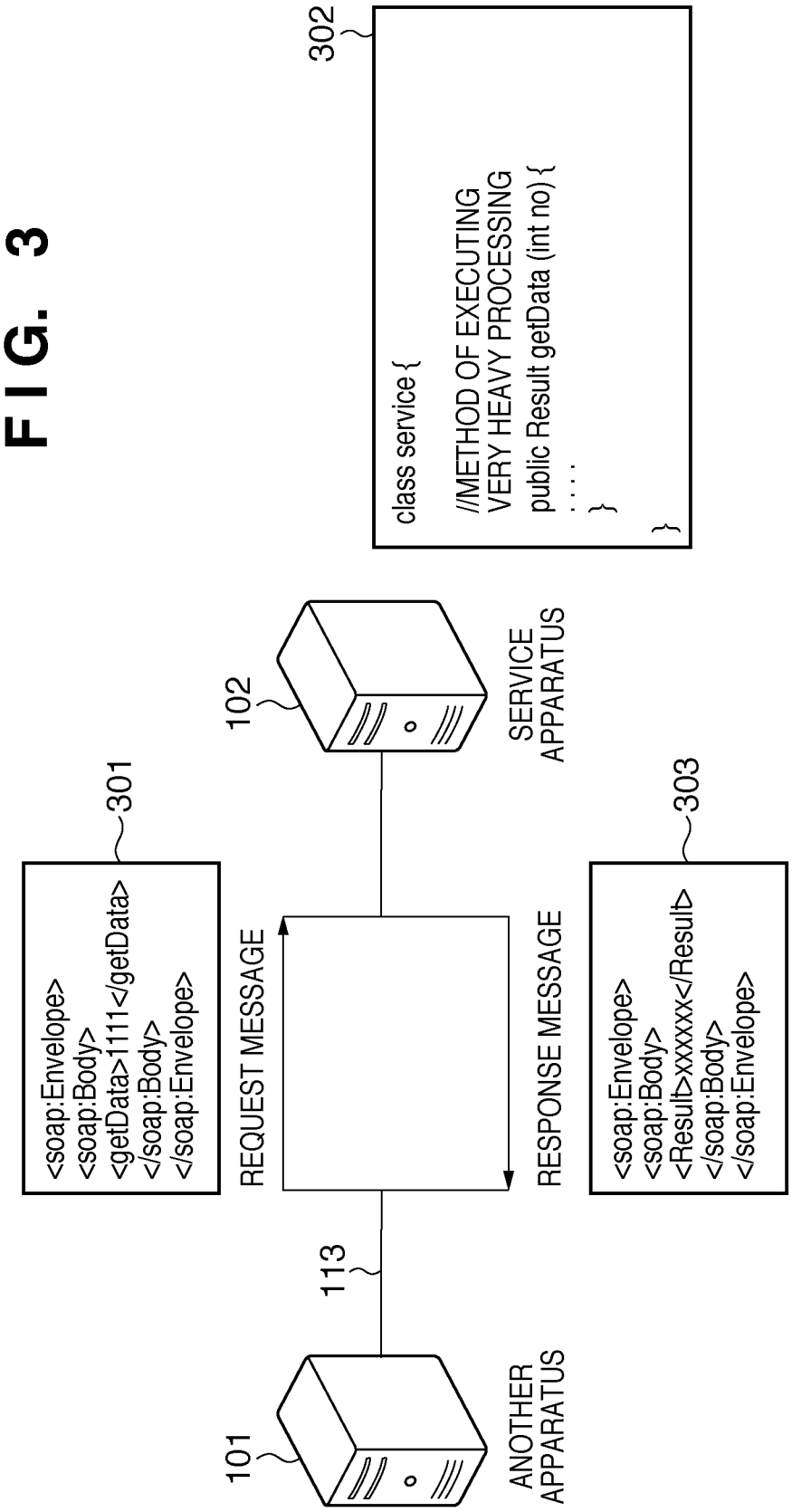
FIG. 3 is a view showing processing when a request message with no identifier is issued.

The characteristic processing of the service apparatus according to this embodiment will be explained next with reference to FIGS. 3 to 8. FIG. 3 illustrates a detailed example in which request messages with no identifiers are exchanged. A request message 301 is a detailed example of a message transmitted to invoke a getData operation by the other apparatus 101. The request message 301 has no identifier. The service apparatus 102 receives the request message 301 and executes a concrete service logic 302. A concrete response message 303 is created as a result of executing the service logic 302. However, if the connection is disconnected while the service logic 302 is processed, the execution of the service logic 302 is interrupted because the request message 301 has no identifier. Therefore, in this case, no response message 303 is created.

Figure 4:
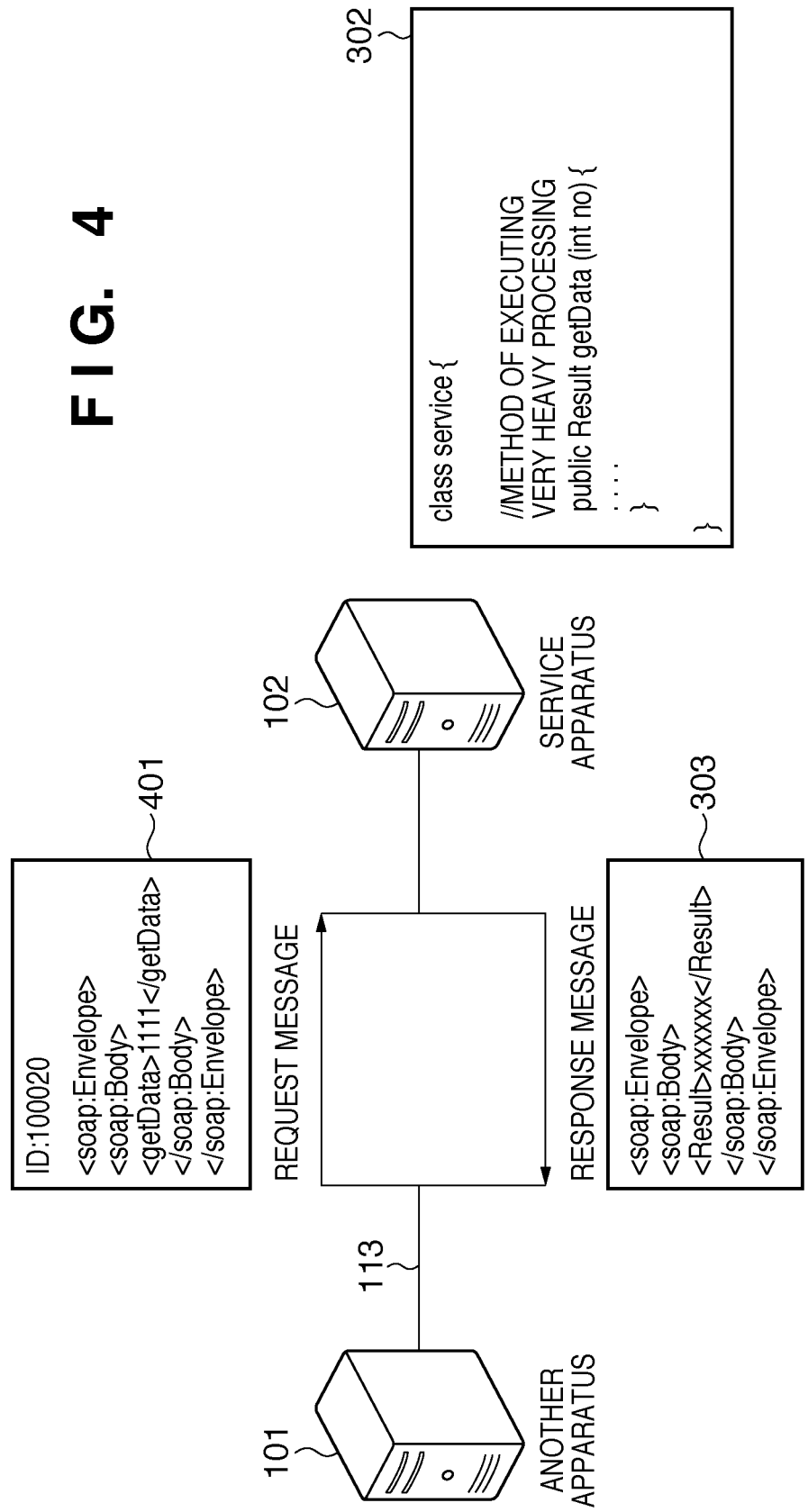
FIG. 4 is a view showing processing when a request message with an identifier is issued.

FIG. 4 illustrates a detailed example in which request messages with identifiers (ID) are exchanged. A request message 401 shows a detailed example of a message transmitted to invoke a getData operation by the other apparatus 101. The request message 401 has an identifier of "100020". Because the service apparatus 102 is accessed using this identifier for the first time, a response message associated with this identifier is absent in the database 211. To cope with this situation, the service apparatus 102 executes a service logic 302 to create a response message 303. As a result of executing the service logic 302, a concrete response message 303 is created. At this time, if the connection is disconnected while the service logic 302 is processed, the execution of the service logic 302 is continued to the end because the request message 401 has an identifier. A response message 303 is created and held in the database 211 in association with an identifier of "100020".

Figure 5:
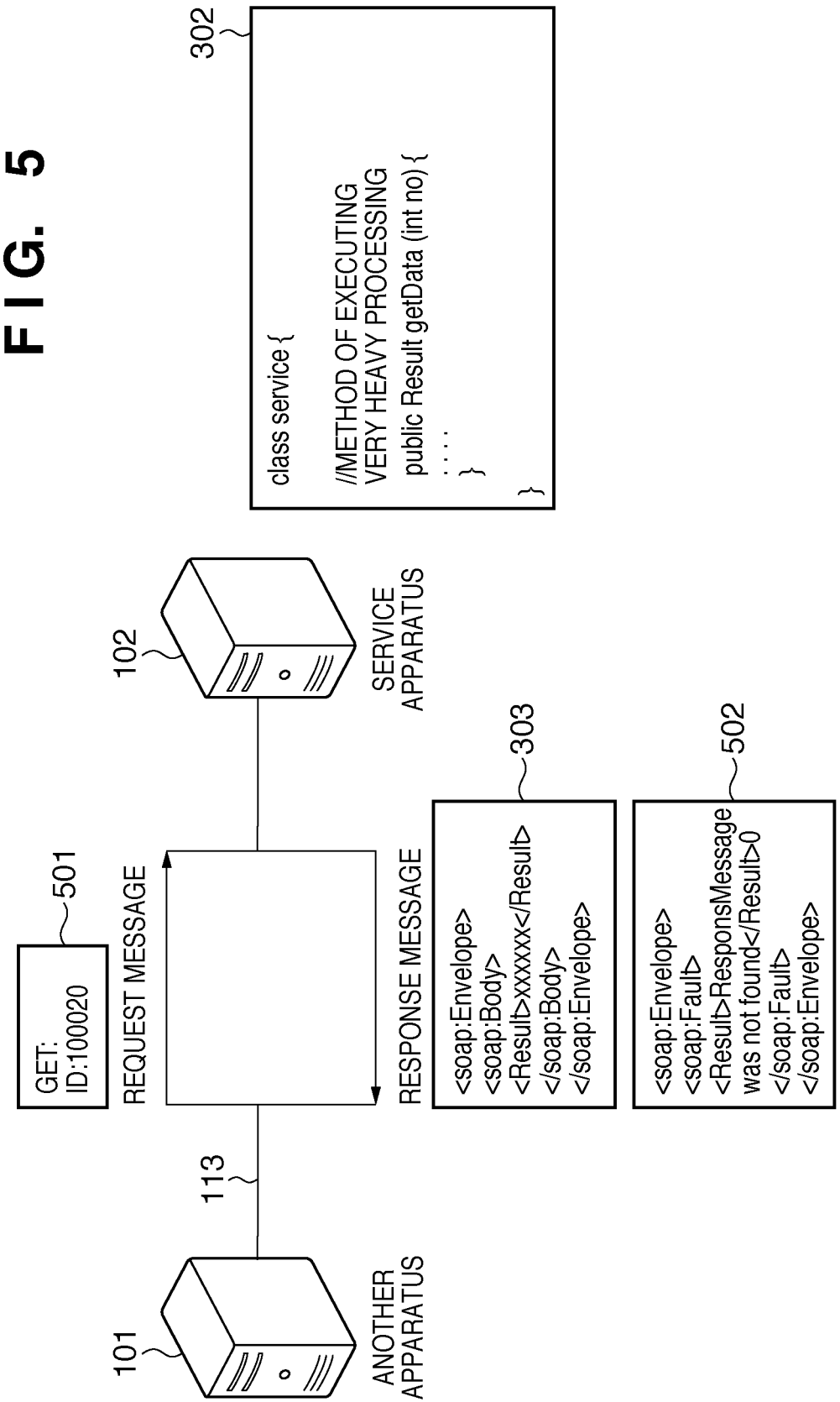
FIG. 5 is a view showing processing when a request message containing an identifier alone is issued.

As shown in FIG. 5, if the request message 401 is transmitted from the other apparatus 101 again, a response message 303 associated with an identifier of "100020" is transmitted to the other apparatus 101 without executing the service logic 302 because this response message is present in the database 211. Information of the response message 303 associated with an identifier of "100020" is deleted from the database 211.

Also, if the connection is not disconnected while the service logic 302 is processed, the response message 303 created by executing the service logic 302 is directly transmitted to the other apparatus 101.

Note that FIG. 5 shows a message exchanged between the apparatus if an identifier alone is transmitted from the other apparatus 101. A request message 501 containing identifier information alone is transmitted. The service apparatus 102 determines whether a response message associated with the transmitted identifier of "100020" is stored in the database 211. If it is determined that the associated response message 303 is present, this message is transmitted and the stored message information is deleted from the database 211, as explained with reference to FIG. 4. In contrast, if the associated response message 303 is absent, the service to be executed corresponding to the identifier is unidentified. Hence, a fault message is created as a concrete response message 502. The response message 502 indicating that the service execution has failed is transmitted to the other apparatus 101.

Figure 6:
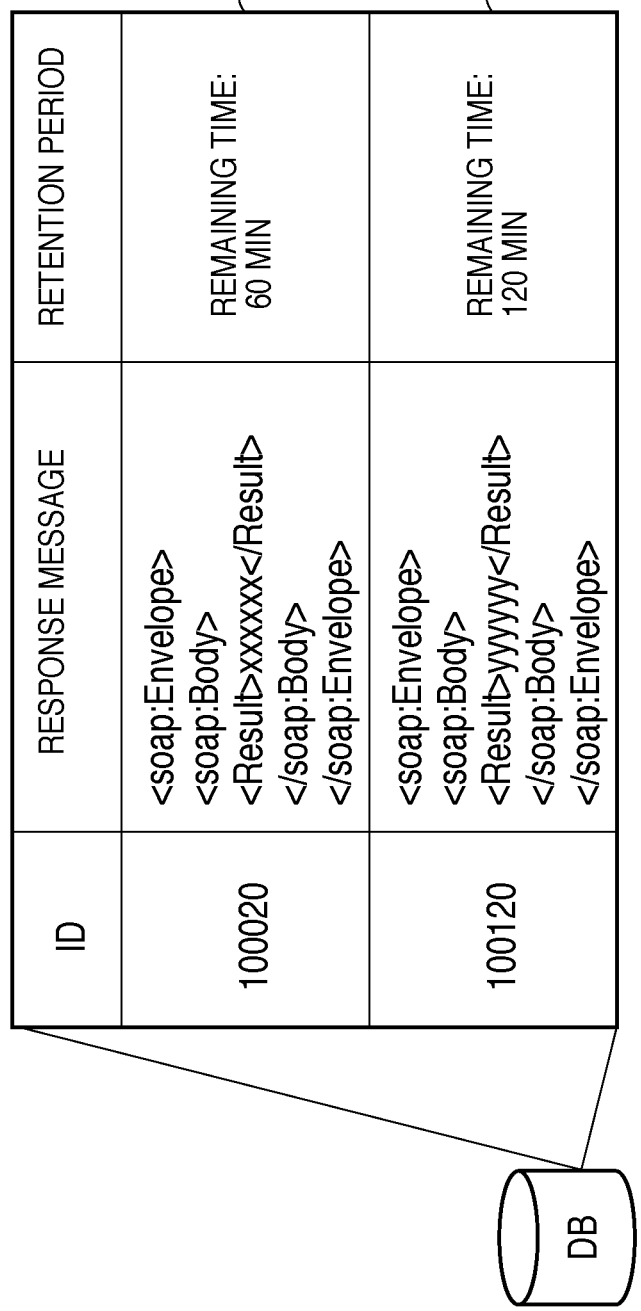
FIG. 6 is a table illustrating one example of information held in a database.

FIG. 6 illustrates one example of information held in the database 211 of the above-mentioned service apparatus 102. If the connection is disconnected while the service designated in the request message 401 shown in FIG. 4 is processed, an identifier of "100020" is stored together with a response message (601). In this example, an identifier of "100120" is also stored together with a response message (602). Also in this example, the retention period is moreover described as a remaining time of 60 min in case of 601, and a remaining period of 120 min in case of 602. This table shows an example in which the period during which data is retained in the database 211 of the service apparatus 102 is set.

When the other apparatus 101 issues a service execution request, the connection may be disconnected for two reasons. First, the other apparatus 101 disconnects the connection without intention due to, for example, a network failure or time-out. In this case, the other apparatus 101 is more likely to perform a retry. In contrast, the other apparatus 101 may intentionally disconnect the connection for some reason. In this case, the other apparatus 101 may or may not perform a retry later. Therefore, a message for which a retry never occurs again is present. It is undesirable to indefinitely store a message that is never accessed again, so it is desirable to set a predetermined retention period.

In this embodiment, the manufacturer of the service apparatus 102 freely sets this retention period. In another embodiment, this retention period is attached to the request message from the other apparatus 101 as information. Data whose retention period has expired is deleted. Even when a request message with an identifier corresponding to the deleted data is transmitted, a service logic corresponding to the data is executed as long as this message contains a service message corresponding to the data, as shown in FIG. 4, so no problem arises. Note that a fault response message is returned if the request message contains an identifier alone, as shown in FIG. 5.

Figure 7A:
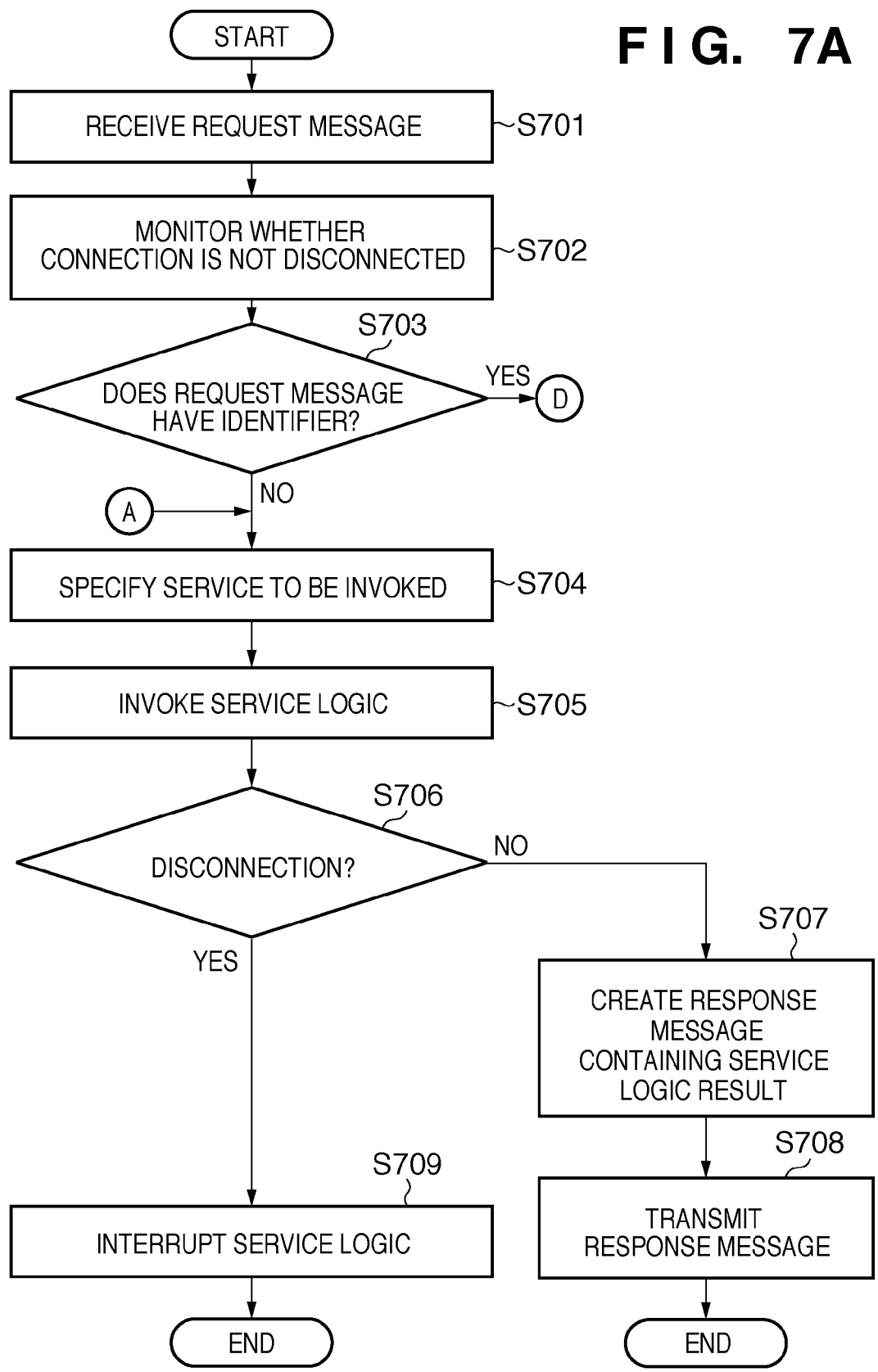

The processing of the service apparatus 102 according to this embodiment will be explained next with reference to the flowchart shown in FIGS. 7A and 7B. The flowchart shown in FIGS. 7A and 7B is implemented by executing a program by the CPU 103. This program is stored in the HD device 105 or in the ROM in the memory 104 and loaded into the RAM in the memory 104 when the CPU 103 executes it.

The message reception unit 202 receives a request message 201 sent from the other apparatus 101 (S701). The request message 201 is received via a connection formed between the service apparatus 102 and the other apparatus 101. The disconnection detection unit 203 constantly monitors whether the connection is not disconnected (S702). If disconnection is detected, the message reception unit 202 is immediately notified of it. The sent information is transferred to all other processing units.

The message analysis unit 204 determines whether the request message 201 has an identifier (S703). If it is determined that the request message 201 has no identifier (NO in step S703), the service to be invoked is specified (S704), and the processing shifts to the service logic control unit 205. The service logic control unit 205 executes the service logic 206 based on the service specified by the message analysis unit 204 (S705). If the request message 201 is the request message 301 for invoking the getData operation mentioned above, the service logic 302 shown in FIG. 3 is executed.

At this time, if the disconnection detection unit 203 does not detect disconnection while the service logic 206 is executed (NO in step S706), the message creation unit 207 creates a response message 209 containing the service logic result (S707). The message transmission unit 208 transmits the created response message 209 to the other apparatus 101 (S708), and the processing ends.

If the disconnection detection unit 203 detects disconnection (YES in step S706), the service logic control unit 205 interrupts the execution of the service logic 206 (S709), and the processing ends. Several service logic interruption methods are available herein. For example, a thread is separately set, a service logic is executed, and the thread is stopped when interruption is detected. Alternatively, a cancellation method is prepared in the service logic and invoked. An interruption method may be arbitrarily implemented. Note that the processing is interrupted and ends also when the connection is disconnected while a response message 209 is created in step S707 or the response message 209 is transmitted in step S708.

Also, if the message analysis unit 204 determines that the request message 201 has an identifier, like the above-mentioned request message 401 (YES in step S703), the processing shifts to the to-be-transmitted message management unit 210. The to-be-transmitted message management unit 210 determines whether a response message corresponding to an identifier of "100020" is present in the database 211 (S710). If it is determined that a request message with an identifier of "100020" is received for the first time, a response message corresponding to it is absent in the database 211 (NO in step S710). To cope with this situation, the message analysis unit 204 analyzes the message to specify the service to be invoked (S711). If the request message 201 matches the request message 401, it is possible to specify the service to be invoked because this message contains service invoking information (YES in step S711). The request message 401 serves to invoke a getData operation.

The service logic control unit 205 executes the service logic 206 based on the service specified by the message analysis unit 204 (S712). In this case, the above-mentioned service logic 302 is executed. The message creation unit 207 creates a response message 209 containing the result of the service logic 206 (S713). If the disconnection detection unit 203 does not detect disconnection (NO in step S714), the message transmission unit 208 transmits the response message 209 to the other apparatus 101 (S715), and the processing ends.

If the disconnection detection unit 203 detects disconnection while the service logic is executed (YES in step S714), the processing shifts to the to-be-transmitted message management unit 210. The to-be-transmitted message management unit 210 stores an identifier of "100020" and the created response message 303 in the database 211 in association with each other, as shown in 601 (S716), and the processing ends. Note that the processing shifts to step S716 also when the connection is disconnected while the response message 209 is transmitted in step S715.

Also, if the to-be-transmitted message management unit 210 determines in step S710 mentioned above that a response message corresponding to an identifier of "100020" is present in the database 211 (YES in step S710), and the disconnection detection unit 203 detects disconnection (YES in step S717), the processing ends. If the disconnection detection unit 203 does not detect disconnection (NO in step S717), the processing shifts to the message transmission unit 208. At this time, the message transmission unit 208 transmits the corresponding response message to the other apparatus 101 (S718). The information (601) corresponding to the response message that has been transmitted is deleted from the database 211 (S719), and the processing ends. Note that the processing ends when the connection is disconnected while the response message is transmitted in step S718. If the response message has not been transmitted, the information (601) is not deleted.

Also, if the message analysis unit 204 analyzes the request message 201 but cannot specify the service to be invoked in step S711 mentioned above (NO in step S711), the processing shifts to the message creation unit 207. More specifically, it is impossible to specify the service in the following cases: a case in which the data has been deleted because its retention period in the database 211 has expired; a case in which the identifier is fake; a case in which a response message corresponding to the identifier is absent; and a case in which service invoking information contained in the request message 401 has an error. In these cases, the message creation unit 207 creates a response message containing fault information (S720). More specifically, a response message 502 shown in FIG. 5 is created.

If the disconnection detection unit 203 does not detect disconnection (NO in step S721), the message transmission unit 208 transmits the created response message 502 to the other apparatus 101 (S715), and the processing ends. In contrast, if the disconnection detection unit 203 detects disconnection (YES in step S721), the processing directly ends. The created fault message is not stored in the database 211. The processing ends without storing the response message also when the connection is disconnected while the response message is transmitted in step S715.

Processing for deleting data, whose retention period in the database 211 has expired, by the to-be-transmitted message management unit 210 of the service apparatus 102 will be explained herein with reference to the flowchart shown in FIG. 8. For example, data whose retention period in the database 211 is 0 min is deleted from the database 211. In this example, the deletion is done at the timing when the request message 201 is received from the other apparatus 101. Also, this processing is executed between processing steps S701 and S702 because it is confirmed whether data to be deleted is present when the request message 201 is received from the other apparatus 101.

First, the message reception unit 202 receives a request message 201 (S701), and the to-be-transmitted message management unit 210 checks whether data whose retention period in the database 211 has expired is present in the database 211 (S801). If data whose retention period has expired is absent (NO in step S801), the processing directly shifts to the disconnection detection unit 203. In contrast, if data whose retention period has expired is present, for example, if data whose retention period is 0 min is present (YES in step S801), the data is deleted (S802). The processing then shifts to the disconnection detection unit 203.

The data deletion timing is not limited to the above-mentioned one, and another timing may be adopted. For example, corresponding data may be deleted after the message transmission unit 208 transmits the response message 209 (S708, S715, or S718). Alternatively, data whose retention period has expired may be immediately detected and deleted by constantly monitoring the database 211, instead of the timing of processing such as reception or transmission.

As described above, the other apparatus 101 which uses a service can efficiently acquire data using the above-mentioned processing of the service apparatus 102. For example, the other apparatus 101 transmits a request message 401 with an identifier to the service apparatus 102. If the service logic 302 executed by the service apparatus 102 is known to implement very heavy processing, the other apparatus 101 intentionally disconnects the connection. After a while, the other apparatus 101 transmits the request message 401 to the service apparatus 102 again. With this operation, the service apparatus 102 has already completed the execution of the service logic 302, and the response message 303 is stored in the database 211. Therefore, the response message is immediately transmitted to the service apparatus 102.

With the foregoing processing, the other apparatus 101 need not always keep the connection to acquire a response message from the service apparatus 102. While the service apparatus 102 executes the processing, the other apparatus 101 can execute another processing. In addition, even if a time-out occurs as a result of keeping the connection for a long time, the processing executed so far is never thrown away.

According to this embodiment, it is possible to keep service logic execution to the minimum necessary to implement a service, and to reduce a load for a built-in device with a relatively small memory.

<Second Embodiment>

The second embodiment of the present invention will be described next. A method of, when disconnection is detected, interrupting the service logic processing if the request message has no identifier, and directly continuing this processing if this message has an identifier has been explained in the first embodiment. A method of, even when the request message has an identifier in the first embodiment, interrupting the service logic processing in accordance with the database state will be explained in the second embodiment. The processing overview will be explained with reference to FIGS. 9 and 10. Note that FIG. 9 shows a configuration obtained by partially changing that shown in FIG. 2, and the same reference numerals as in FIG. 2 denote the same constituent components in FIG. 9. A description of the same parts as in FIG. 2 will not be given in the second embodiment.

FIG. 9 illustrates one example of the software configuration of a service apparatus 102. A DB state confirmation unit 901 can confirm the use state of the storage area of a database 211. More specifically, the upper limit of the usable size of the storage area of the database 211 is set in advance, and it is confirmed whether the used size does not exceed the set upper limit. When a request message 201 has an identifier and a disconnection detection unit 203 detects disconnection, a to-be-transmitted message management unit 210 instructs the DB state confirmation unit 901 to confirm the use state of the database 211. If the use state has already exceeded the set upper limit, the to-be-transmitted message management unit 210 issues an interrupt instruction to a service logic control unit 205. The service logic control unit 205 interrupts the processing of a service logic 206.

With the foregoing processing, even when the request message 201 has an identifier, the service logic processing can be interrupted in accordance with the state of the database 211.

Figure 10:
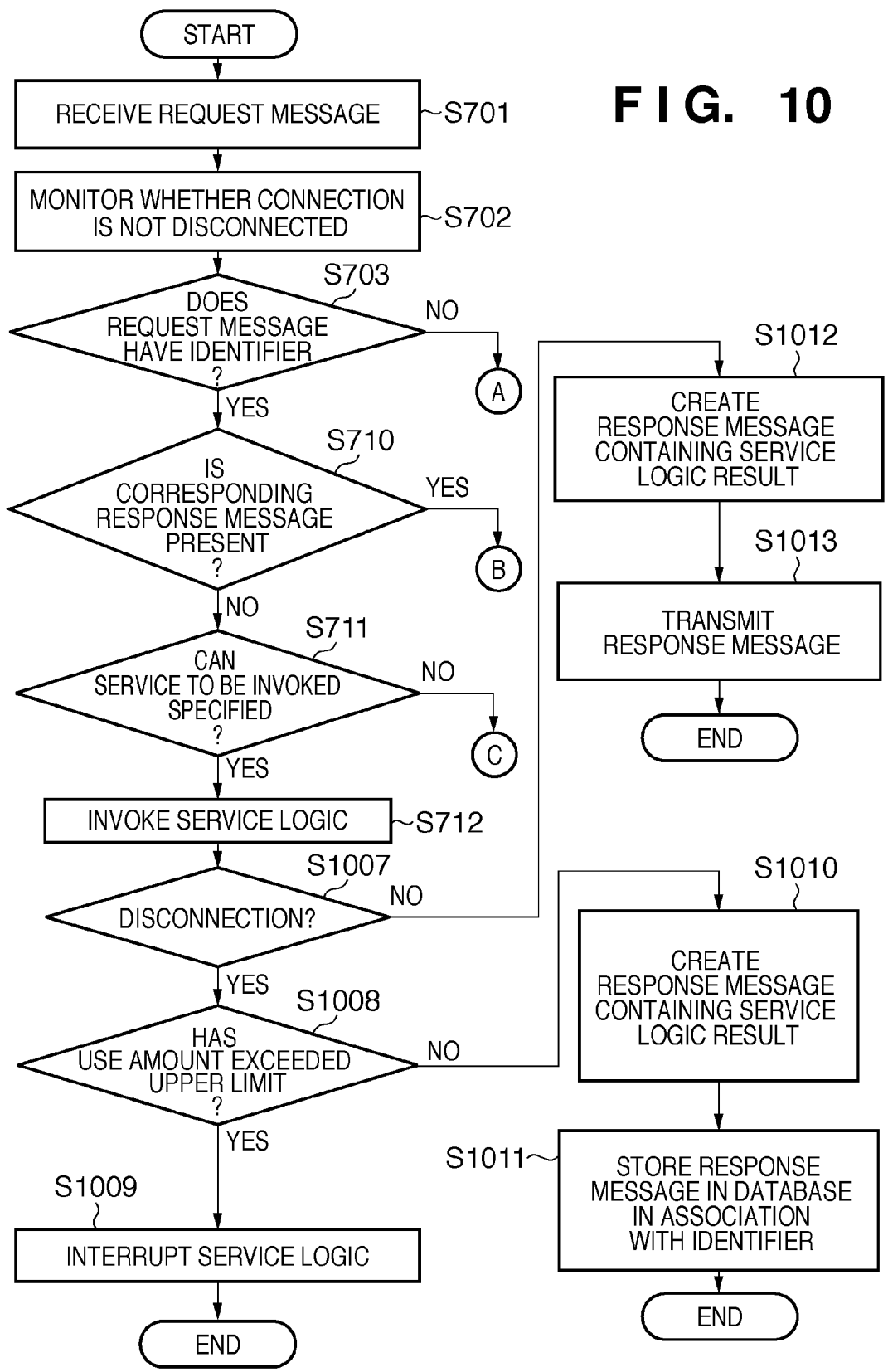
FIG. 10 is a flowchart showing the processing of the communication apparatus according to the embodiment.

The processing of the service apparatus 102 will be explained next with reference to the flowchart shown in FIG. 10, as in the first embodiment. The same reference numerals as in FIGS. 7A and 7B denote the same processing steps in FIG. 10, and a description thereof will not be given.

A description will begin with a case in which YES is determined in step S703. The to-be-transmitted message management unit 210 determines whether a response message corresponding to the identifier is present in the database 211 (S710). If it is determined that a response message corresponding to the identifier attached to the request message 201 is absent (NO in step S710), a message analysis unit 204 analyzes the message to specify the service to be invoked (S711). If the specification has succeeded (YES in step S711), the service logic control unit 205 executes the service logic 206 based on the service specified by the message analysis unit 204 (S712).

If the to-be-transmitted message management unit 210 receives disconnection information while the service logic 206 is executed (YES in step S1007), it instructs the DB state confirmation unit 901 to confirm the use state of the database 211. The DB state confirmation unit 901 determines whether the used area of the database 211 has already exceeded the preset upper limit (S1008). If it is determined that the upper limit has already been exceeded (YES in step S1008), the to-be-transmitted message management unit 210 requests the service logic control unit 205 to interrupt the service logic. The service logic control unit 205 interrupts the service logic 206 in progress (S1009), and the processing ends.

If the DB state confirmation unit 901 determines that the upper limit has not been exceeded (NO in step S1008), a message creation unit 207 creates a response message 209 containing the service logic result (S1010). The to-be-transmitted message management unit 210 stores the identifier of the request message 201 and the created response message in the database 211 in association with each other (S1011), and the processing ends.

If disconnection does not occur while the service logic 206 is executed (NO in step S1007), the message creation unit 207 creates a response message 209 containing the service logic result (S1012). The message transmission unit 208 transmits the created response message 209 to another apparatus 101 (S1013), and the processing ends. Note that the processing advances to step S1008 when the connection is disconnected while a response message 209 is created in step S1012 or the response message 209 is transmitted in step S1013.

If the message analysis unit 204 determines that the request message has no identifier (NO in step S703), the processing advances to step S704 in FIG. 7A. Subsequent processing is the same as that in step S704 and subsequent steps (until step S708 or S709) in FIG. 7A, and a description thereof will not be given.

If the to-be-transmitted message management unit 210 determines that a response message corresponding to the identifier of the request message 201 is present (YES in step S710), the processing advances to step S717 in FIG. 7B. Subsequent processing is the same as that in step S717 and subsequent steps (until step S719) in FIG. 7B, and a description thereof will not be given.

If the message analysis unit 204 cannot specify the service to be invoked (NO in step S711), the processing advances to step S720 in FIG. 7B. Subsequent processing is the same as in that in step S720 and subsequent steps (until step S715) in FIG. 7B, and a description thereof will not be given.

The foregoing method can control service logic interruption in accordance with the database state even when the request message has an identifier. This makes it possible to normally interrupt the service logic in accordance with the database state even when a large amount of messages with identifiers are incessantly sent to the service apparatus, thus reducing a load for the service apparatus. It is also possible to interrupt the service logic processing before the database area runs out when a large amount of response services or a large-sized response service is stored in the database, thus preventing the processing of the service apparatus from stopping irregularly.

Figure 11A:
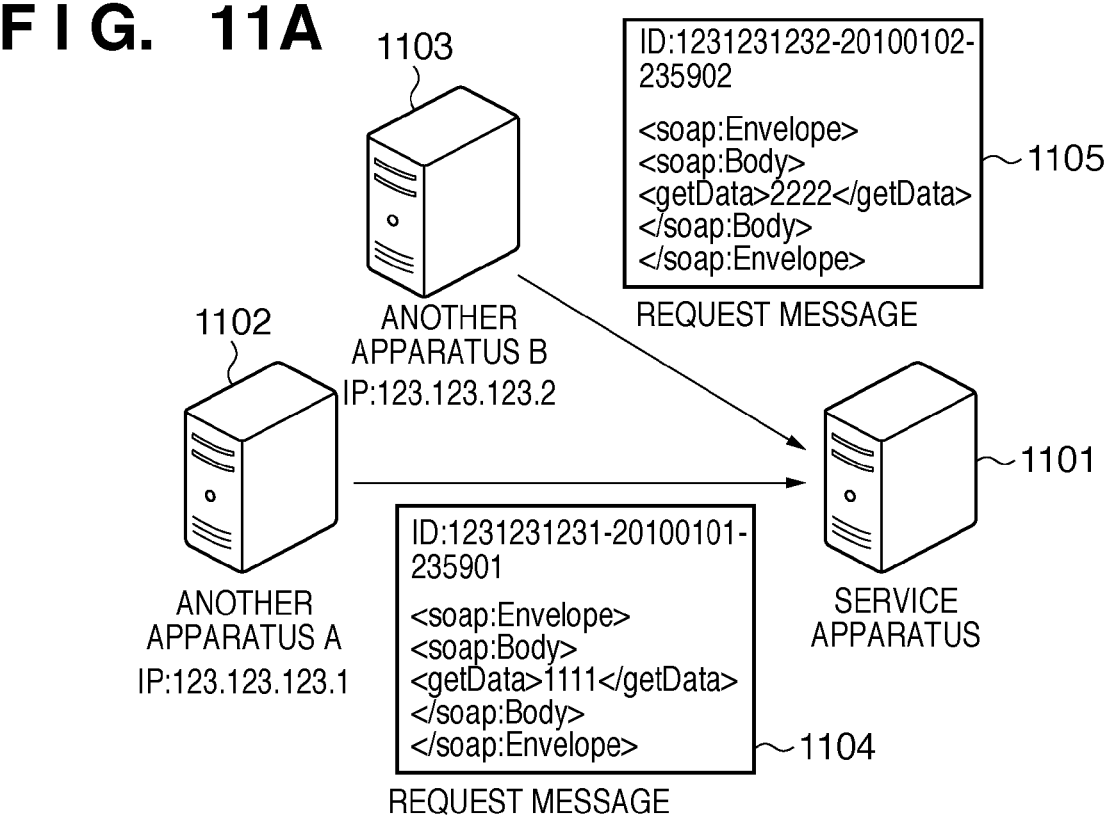
FIGS. 11A and 11B are views illustrating examples of an identifier.
Figure 11B:
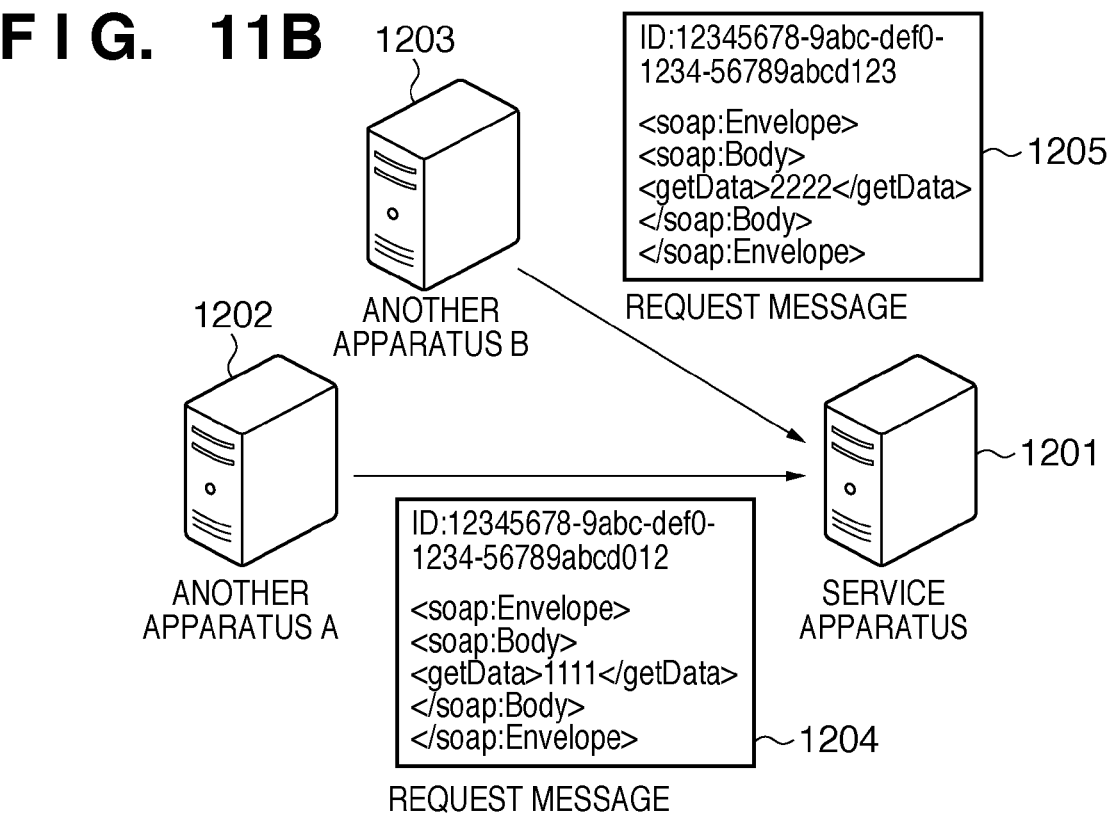

The format of the identifier described in the first and second embodiments will be explained next with reference to FIGS. 11A and 11B. Referring to FIG. 11A, a service apparatus 1101 receives request messages not only from another apparatus A 1102 but also from another apparatus B 1103. That is, the service apparatus may receive request messages from a plurality of other apparatus. The other apparatus individually generate identifiers and attach them to request messages, so some identifiers stored in the service apparatus may overlap each other when they are generated using, for example, only a single list of numeric values. If such overlapping occurs, the service apparatus cannot normally store, in the database, a response message to be managed in association with an identifier. To cope with this situation, an example in which the probability that some identifiers overlap each other is reduced will be explained in this embodiment.

FIG. 11A describes an example in which an identifier is generated in combination with the IP address of another apparatus serving as a request message transmitter and the transmission date/time. The request message has an identifier of "1231231231-20100101-235901", as indicated by a request message 1104, when the IP address of the other apparatus A 1102 is 123.123.123.1 and the transmission date/time is 2010/01/01 23:59:01. Similarly, the request message has an identifier of "1231231232-20100102-235902", as indicated by a request message 1105, when the IP address of the other apparatus B 1103 is 123.123.123.2 and the transmission date/time is 2010/01/02 23:59:02.

The format of another identifier will be explained with reference to FIG. 11B. FIG. 11B shows the same configuration as that shown in FIG. 11A. FIG. 11B exemplifies a case in which request messages are transmitted from another apparatus A 1202 and another apparatus B 1203, and describes an example in which an identifier is generated in the UUID (Universally Unique Identifier) format. The other apparatus A 1202 generates an identifier in the UUID format and attaches "12345678-9abc-def0-1234-56789abcd012" to a request message, as indicated by a request message 1204. Similarly, the other apparatus B 1203 generates an identifier in the UUID format and attaches "12345678-9abc-def0-1234-56789abcd123" to a request message, as indicated by a request message 1205. A UUID is a specification to generate a uniquely specifiable identifier and is the to cause practically neither overlapping nor accidental coincidence even without control in the network system environment. Hence, the use of an identifier having the UUID format makes it possible to reduce the probability of occurrence of overlapping in the process of storing a response message in a database in association with an identifier by the service apparatus 1201.

The use of an identifier having the above-mentioned format allows processing involved even when a plurality of other apparatus access the service apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-130937, filed May 29, 2009 and 2010-056542, filed Mar. 12, 2010, which are hereby incorporated by reference herein in their entirety.

What is claimed is:

1. A processing method executed by a processing apparatus including a processor including a database for storing response messages generated in response to receiving messages from a processing request source, the method comprising steps of:

receiving a message from the processing request source with a request including a processing request for execution of a requested processing, wherein the message is either a message having information that identifies the message or a message not having information that identifies the message;

determining whether the message has information that identifies the message;

starting the execution of the requested processing by the processor;

canceling, when the connection to the processing request source is disconnected and the message does not have the identifying information, the execution of the requested processing without storing a corresponding response message in the database to be sent to the processing request source when connected to the processing apparatus;

determining, when the message contains identifying information, whether the database stores a response message corresponding to identifying information; and storing, when the connection to the processing request source is disconnected and the message has the identifying information, a corresponding response message in the database after the response message is generated by the processing apparatus in response to receipt of the message having the identifying information if the database does not store the corresponding response message.

2. The method according to claim 1, wherein in the storing step, a retention time period is set for each processing result of the execution stored in the memory and the processing result of the execution stored in the memory is deleted after the retention time period has passed.

3. The method according to claim 1, further comprising a step of cancelling the execution of the requested processing without completing the execution of the requested processing and without generating the processing result of the execution of the requested processing, when the connection to the processing request source is disconnected, the message has the information, and not less than a predetermined amount of data is stored in the memory.

4. The method according to claim 1, wherein the execution of the requested processing is cancelled at the time of detection of disconnection with the processing request source when the message does not have the information.

5. The method according to claim 1, further comprising the steps of:

determining whether to start the execution of the requested processing based on whether there is a processing result of the execution stored in the memory that has the same information as the information that the received message has;

starting, when there is not a processing result of the execution stored in the memory that has the same information as the information that the received message has, the execution of the requested processing; and transmitting, when there is a processing result of the execution stored in the memory that has the same information as the information that the received message has, the processing result of the execution stored in the memory to the processing request source, without starting the execution of the requested processing.

6. The method according to claim 5, wherein, in the transmitting step, the processing result of the execution stored in the memory is deleted after being transmitted.

7. The method according to claim 1, wherein the processing request includes the request for the execution of the requested processing and a request for transmitting the processing result of the execution of the requested processing, and when the connection to the processing request source is disconnected and the message does not have the information, the execution of the requested processing is canceled during the execution of the requested processing and before starting processing the request for transmitting the processing result of the execution of the requested processing.

8. The method according to claim 1, further comprising determining whether or not to cancel the execution of the requested processing during the execution of the requested processing without completing the execution of the requested processing and without generating the processing result of the execution of the requested processing, based on whether the message has the information that identifies the message, when the connection to the processing request source is disconnected.

9. A processing apparatus comprising:

a database configured to store response messages generated in response to receiving messages from a processing request source;

a communication unit that receives a message from the processing request source with a request including a processing request for execution of a requested processing, wherein the message is either a message having information that identifies the message or a message not having information that identifies the message; and a processor that:

determines whether the message has information that identifies the message;

starts the execution of the requested processing;

cancels, when the connection to the processing request source is disconnected and the message does not have the identifying information, the execution of the requested processing without storing a corresponding response message in the database to be sent to the processing request source when connected to the processing apparatus; and stores, when the connection to the processing request source is disconnected and the message has the identifying information, a corresponding response message in the database after the response message is generated by the processing apparatus in response to receipt of the message having the identifying information if the database does not store the corresponding response message.

10. The apparatus according to claim 9, wherein the processor further:

determines whether to start the execution of the requested processing based on whether there is a processing result of the execution stored in the memory that has the same information as the information that the received message has;

starts, when there is not a processing result of the execution stored in the memory that has the same information as the information that the received message has, the execution of the requested processing; and transmits, when there is a processing result of the execution stored in the memory that has the same information as the information that the received message has, the processing result of the execution stored in the memory to the processing request source, without starting the execution of the requested processing, wherein, in the transmitting operation, the processing result of the execution stored in the memory is deleted after being transmitted.

11. The apparatus according to claim 10, wherein the processor also cancels the execution of the requested processing without completing the execution of the requested processing and without generating the processing result of the execution of the requested processing, when the connection to the processing request source is disconnected, the message has the information, and not less than a predetermined amount of data is stored in the memory.

12. A non-transitory computer-readable storage medium storing a computer program that when executed causes a computer to perform a processing method, the computer including a memory having database for storing response messages generated in response to receiving messages from a processing request source, the method comprising steps of:
   receiving a message from the processing request source with a request including a processing request for execution of a requested processing, wherein the message is either a message having information that identifies the message or a message not having information that identifies the message;
   determining whether the message has information that identifies the message;
   starting the execution of the requested processing;
   canceling, when the connection to the processing request source is disconnected and the message does not have the information, the execution of the requested processing without storing a corresponding response message in the database to be sent to the processing request source when connected to the computer;
   determining, when the message contains identifying information, whether the database stores a response message corresponding to identifying information; and
   storing, when the connection to the processing request source is disconnected and the message has the identifying information, a corresponding response message in the database after the response message is generated by the computer in response to receipt of the message having the identifying information if the database does not store the corresponding response message.

13. The medium according to claim 12, further comprising the steps of:
   determining whether to start the execution of the requested processing based on whether there is a processing result of the execution stored in the memory that has the same information as the information that the received message has;
   starting, when there is not a processing result of the execution stored in the memory that has the same information as the information that the received message has, the execution of the requested processing; and
   transmitting, when there is a processing result of the execution stored in the memory that has the same information as the information that the received message has, the processing result of the execution stored in the memory to the processing request source, without starting the execution of the requested processing,
   wherein, in the transmitting step, the processing result of the execution stored in the memory is deleted after being transmitted.

* * * * *